S. ESCAMILLA.
TORTILLA MOLDING MACHINE.
APPLICATION FILED OCT. 10, 1906.
1,036,593.
Patented Aug. 27, 1912.
3 SHEETS—SHEET 1.
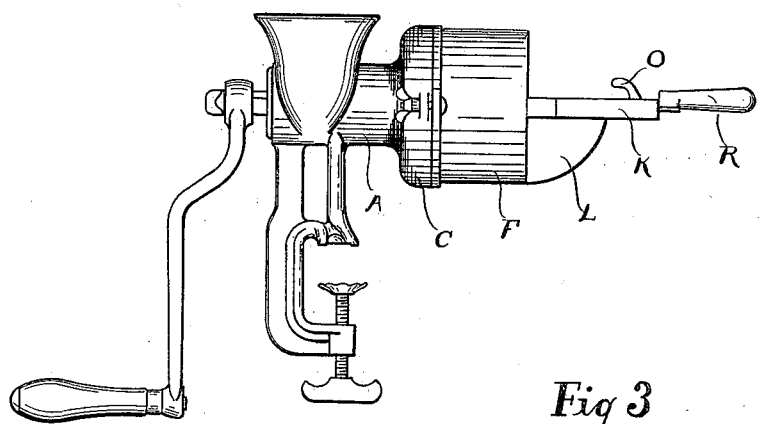
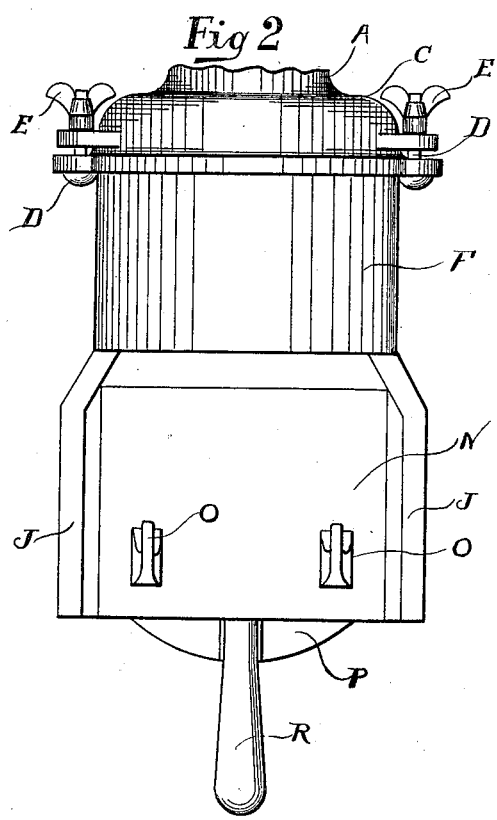
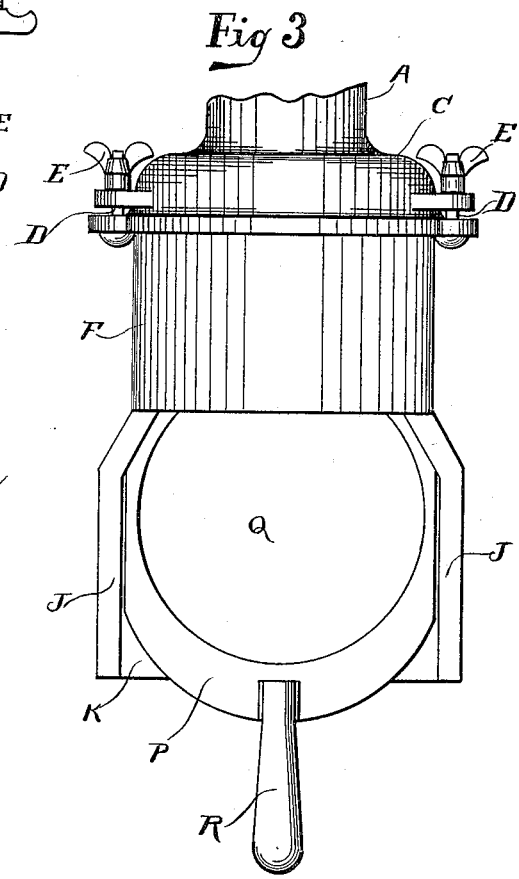
WITNESSES:
INVENTOR.
ATTORNEYS.

S. ESCAMILLA.
TORTILLA MOLDING MACHINE.
APPLICATION FILED OCT. 10, 1906.
1,036,593.
Patented Aug. 27, 1912.
3 SHEETS—SHEET 2.
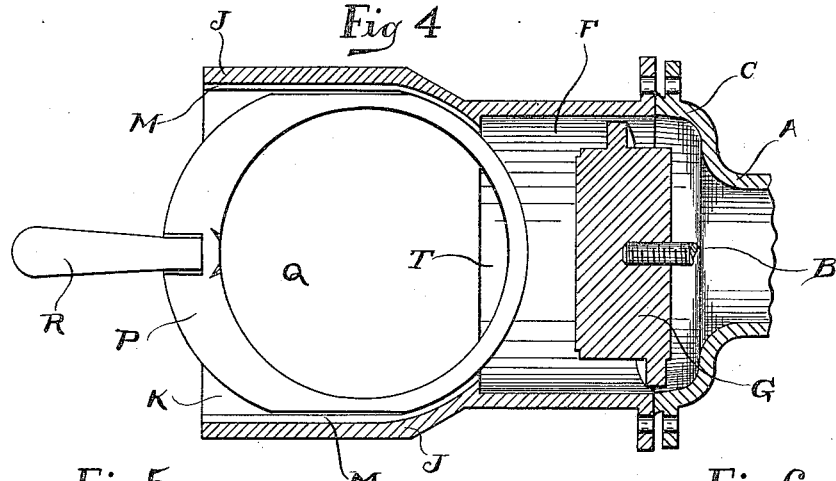
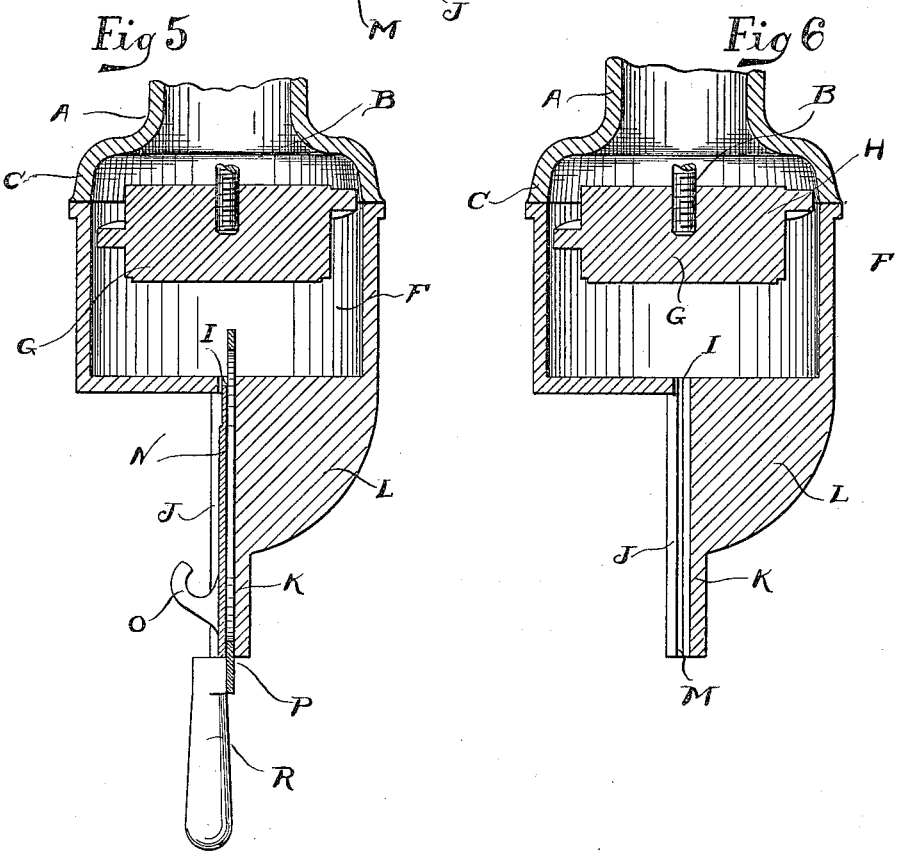
WITNESSES:
H. J. Foote.
John K. Beach
Simon Escamilla INVENTOR.
BY Beach & Fulin
ATTORNEYS S. ESCAMILLA.
TORTILLA MOLDING MACHINE.
APPLICATION FILED OCT. 10, 1906.
1,036,593.
Patented Aug. 27, 1912.
3 SHEETS—SHEET 3.
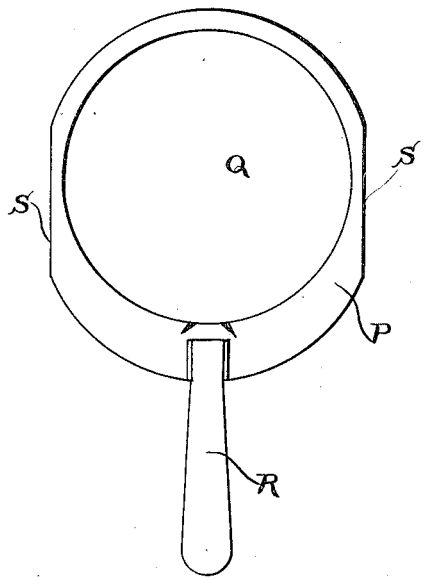
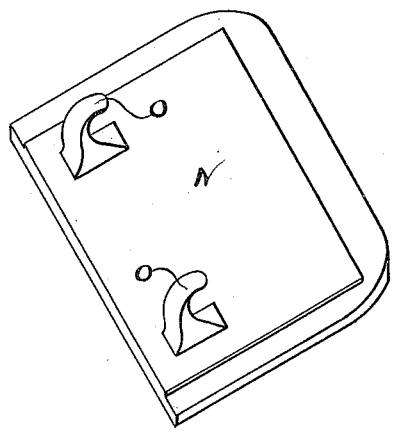
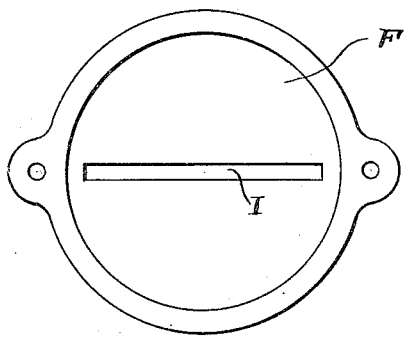

UNITED STATES PATENT OFFICE.

SIMON ESCAMILLA, OF CIUDAD VICTORIA, MEXICO, ASSIGNOR TO SARGENT & COMPANY, OF NEW HAVEN, CONNECTICUT, A CORPORATION OF CONNECTICUT.

TORTILLA-MOLDING MACHINE.

1,036,593.   Specification of Letters Patent.   Patented Aug. 27, 1912.

Application filed October 10, 1906. Serial No. 338,272.

*To all whom it may concern:*

Be it known that I, SIMON ESCAMILLA, citizen of the Republic of Mexico, and residing in the city of Ciudad Victoria, in the State of Tamaulipas, in the Republic of Mexico, have invented new and useful Improvements in Tortilla-Molding Machines, for which I have obtained Letters Patent of the Republic of Mexico, numbered 5,503 and 5,525, dated the 24th and 28th days of April, 1906, respectively, and of which the following is a full, clear, and exact description when taken in connection with the accompanying drawings.

This invention relates to machines for molding tortillas, or similar cakes of meal and other cereals, and has for its object the production of an apparatus for forcing the material directly from the grinding machine into a mold, together with means for withdrawing the tortilla, or other cake, when molded in the form and of the thickness desired. To this end, a receptacle is attached to the grinding machine, into which projects the end of a flat hollow disk, the remainder of which is held between plates, which with the hollow disk form a mold, so that the meal, or other material, as it is ground is forced into this mold where it conforms to the interior lines of the mold. By the withdrawal of the disk, the meal is brought forth in the desired shape and thickness of a tortilla, or other cake.

The invention consists of the above features, and the several other improvements and combinations of parts set forth and claimed hereinafter.

Referring to the drawings for a more particular description, Figure 1 represents a side elevation of a grinding machine, to which is attached a tortilla molding machine embodying the invention. Fig. 2, a top view of the molding machine, Fig. 3, a similar view, with the top plate removed, Fig. 4, a central horizontal section, Fig. 5, a longitudinal vertical central section, Fig. 6, a similar view, with the top plate and hollow disk removed, Fig. 7, a detail plan view of the hollow disk by itself, Fig. 8, a perspective view of the top plate, and Fig. 9, a rear view of the receptacle of the molding machine by itself.

In all figures, similar letters of reference represent like parts.

The parts designated by the letter A represent a grinding machine or food chopper of any desired form, and B the screw threaded end of the forcing screw (not shown) of the grinding machine. To the flanged outer end C of the grinding machine A is secured by bolts D and nuts E a molding machine, which consists primarily of a receptacle F of any desired form, within which is adapted to rotate a feed screw G screwed on to the outer end B of the forcing screw of the grinding machine, so that the rotation of the forcing screw will rotate the feed screw H to feed the material from the grinding machine toward the front end of the receptacle F. In the forward end of the receptacle F is a narrow slot or opening I, and beyond the forward end of the receptacle F is a plate K herein formed integral with the receptacle F and supported thereby by a bracket L. The plate K forms the bottom of the mold for the tortilla, and it is provided, as shown more particularly in Fig. 6, with sides J having grooves M, within which grooves slide the lateral edges of an upper plate N. The upper plate N is provided with handles O, so that it may be drawn in and out of the bottom plate K.

P designates a disk, having a substantially circular opening Q, the inner surface of which forms the side walls of the mold for the tortilla. The disk P is provided with a handle R, and the sides are flattened, as shown more particularly at S (Fig. 7), so that the disk may slide within the side walls J of the bottom plate K. As shown more particularly in Figs. 4 and 5, when the disk P is inserted on the bottom plate K, the extreme end projects through the opening I into the interior of the receptacle F and between the extreme end of the disk P and the opening O is a slight space T through which the meal may be forced into the opening I and into the interior Q of the disk. When the disk is in place between the upper plate N and lower plate K, these plates form the top and bottom of the mold, and the inner surfaces of the interior opening Q of the disk form the sides of the mold into which the meal is forced by the feed screw H, through the opening I of the receptacle F. When the meal has been forced into this space, it will conform to the interior form of the disk P and will be of a thickness equal to the distance between the two plates N and K, which, as shown in Fig. 5, is substantially the thickness of the disk P. Upon the withdrawal of the disk P by the handle R, the meal in the interior thereof will be drawn out of the molding machine in the desired form, and may be dropped upon a platter, pan, or other article as desired.

The operation of molding the tortilla may be repeated as often as desired by inserting the disk P between the upper and lower plates into the position shown in Figs. 1 and 5, and feeding of the meal into its interior by the feed screw H. When desired the upper plate N may be withdrawn by the handles O.

Having now described my invention, what I claim and desire to secure by Letters Patent, is:—

1. The combination with a food chopper having a substantially cylindrical casing, of a receptacle directly secured to the rear end of said casing, and flat tortilla-molding members carried by said receptacle; substantially as described.

2. The combination with a food chopper having a casing open at the rear end, of a receptacle detachably secured to the rear end of said casing and communicating with said casing, and flat tortilla-molding members carried by said receptacle; substantially as described.

3. The combination with a food chopper having a casing open at the rear end, of a receptacle secured to the rear end of said casing, flat mold members carried by said receptacle and having a space between them in communication with said receptacle, and a flat mold member movable between said first named members; substantially as described.

4. The combination with a food chopper having a casing open at the rear end, of a receptacle applied to the rear end of said casing and in communication therewith, flat tortilla-molding members carried by said receptacle, and means for forcing the material from the casing into said receptacle; substantially as described.

5. The combination with a food chopper, of a molding device comprising a receptacle attached to the casing of said chopper, mold plates extending from said receptacle and having a space between them in communication with the latter, and a mold member slidable between said plates; substantially as described.

6. In a machine such as described, the combination of a receptacle, and a molding device carried thereby, and comprising members with opposing surfaces defining a space open at both ends, one end being in communication with said receptacle, and a hollow mold member slidable in said space and of such length that when the cavity thereof is located partially within said receptacle, the opposite end of said member projects out of the other end of the aforesaid space; substantially as described.

7. In a machine for molding tortillas and similar articles, the combination with a receptacle, of a fixed molding device having a space between the same open at both ends, a hollow mold member fitting within said device and removable longitudinally thereof out of one end of said device, and grip means carried by said member to withdraw the same, the other end of the molding device extending into the receptacle; substantially as described.

8. In a machine for molding tortillas and similar articles, the combination with a receptacle, of a molding device having a longitudinal opening therein communicating at its inner end with the receptacle, and a removable hollow mold member communicating at one end with the receptacle and having a handle at its other end projecting through the opening in the outer end of the device; substantially as described.

9. In a machine for molding tortillas, or similar articles, the combination with a receptacle having a narrow opening; of two plates having a space between them accessible through said opening; and a disk having a hollow interior adapted to slide between said plates and project through said opening; and means for forcing meal, or similar substances, through said opening; substantially as described.

10. In a machine for molding tortillas, or similar articles, the combination with a receptacle; of a feed screw mounted to rotate therein; two plates secured thereto leaving a narrow space between; a disk movable longitudinally in said space adapted to project into said receptacle sufficiently whereby access may be obtained from said receptacle to the hollow interior of the disk from above or below said disk; substantially as described.

11. In a machine for molding tortillas, or similar articles, the combination with a receptacle; of a feed screw mounted to rotate therein; a plate having ways therein; a second plate slidable in said ways; and a hollow disk adapted to be slidably mounted between said plates; substantially as described.

12. In a machine for molding tortillas, or similar articles, the combination with a frame having a hollow interior and two parallel surfaces extending therefrom; a hollow disk adapted to slide longitudinally between said surfaces and project into said interior; and means for forcing meal or other substances from said interior into said disk; substantially as described.

13. In a machine for molding tortillas, or similar articles, the combination with grinding mechanism, of a device for molding the tortilla; and means for forcing the meal or similar substances from said grinding mechanism to said molding device, mounted to turn on an axis directed lengthwise of said grinding mechanism; substantially as described.

14. In a machine for molding tortillas, the combination with grinding mechanism, of a support carrying mold members with opposing flat surfaces defining a space between them, and mechanism for forcing meal or the like from said grinding mechanism into said space, mounted to turn on an axis directed lengthwise of said grinding mechanism; substantially as described.

In witness whereof, I have hereunto set my hand on the 28th day of September, 1906.

SIMON ESCAMILLA.

Witnesses:
AURELIO COLLADO,
MARIANO GONRÀLEZ.

Copies of this patent may be obtained for five cents each, by addressing the "Commissioner of Patents, Washington, D. C."